United States Patent [19]

Muroi

[11] Patent Number: 4,982,423
[45] Date of Patent: Jan. 1, 1991

[54] DATA STORAGE APPARATUS

[75] Inventor: Katsumi Muroi, Tachikawa, Japan

[73] Assignee: Casio Computer Co., Ltd., Tokyo, Japan

[21] Appl. No.: 384,258

[22] Filed: Jul. 21, 1989

[30] Foreign Application Priority Data

Aug. 1, 1988 [JP] Japan .................. 63-102221[U]

[51] Int. Cl.$^5$ .................. H04M 1/27; H04M 1/56
[52] U.S. Cl. .................. 379/354; 379/355; 379/444
[58] Field of Search .................. 379/354, 444, 396, 355

[56] References Cited

U.S. PATENT DOCUMENTS

| | | | |
|---|---|---|---|
| 4,117,542 | 9/1978 | Klausner et al. | 364/900 |
| 4,751,668 | 6/1988 | Aihara | 364/900 |
| 4,769,836 | 9/1988 | Aihara | 379/361 |

FOREIGN PATENT DOCUMENTS

| | | | |
|---|---|---|---|
| 0092144 | 4/1988 | Japan | 379/354 |
| 0215286 | 9/1988 | Japan | 379/354 |

Primary Examiner—Thomas W. Brown
Attorney, Agent, or Firm—Frishauf, Holtz, Goodman & Woodward

[57] ABSTRACT

A large number of name and telephone number numerical data can be stored in a RAM, and a reservation flag which represents whether a call is made or not can be set for each telephone number numerical data. A time mode for displaying time, a search mode for sequentially displaying all telephone number data stored in the RAM, or a reservation mode for displaying only the telephone number data having a reservation flag can be selectively set upon operations of switches SW1 and SW3. A dialing tones generator and a speaker are arranged to convert the displayed telephone number data into dialing tones and output the converted dialing tones.

30 Claims, 11 Drawing Sheets

FIG.1

| | | | | |
|---|---|---|---|---|
| X — | DISPLAY REGISTER ╱ 3 | | | |
| Y — | TIME REGISTER | | | |
| | M | P | | |
| R0 — | AOKI | 03-331-4623 | 1 | — F0 |
| R1 — | EDO | 0552-23-4667 | 0 | — F1 |
| R2 — | FUJITA | 03-567-3113 | 0 | — F2 |
| R3 — | OHKUBO | 0425-41-1263 | 1 | — F3 |
| | | | | |
| R99 — | SATO | 03-261-4255 | 1 | — F99 |

|   |   |   |   |   |   |
|---|---|---|---|---|---|
| X — | DISPLAY REGISTER | | | | |
| Y — | TIME REGISTER | | | | |
|   | M | P | N | | |
| R0 — | AOKI | | 03-331-4623 | A | — G0 |
| R1 — | EDO | | 0552-23-4667 | B | — G1 |
| R2 — | FUJITA | | 03-567-3113 | B | — G2 |
| R3 — | OHKUBO | | 0425-41-1263 | A | — G3 |
|   | | | | | |
| R99 — | SATO | | 03-261-4255 | A | — G99 |

| | | | | | | |
|---|---|---|---|---|---|---|
| X → | DISPLAY REGISTER | | | | | |
| Y → | TIME REGISTER | | | | | |
| | M | P | N | | | |
| R0 → | AOKI | | 03-331-4623 | | A | C | |
| R1 → | EDO | | 0552-23-4667 | | B | C | |
| R2 → | FUJITA | | 03-567-3113 | | B | | D |
| R3 → | OHKUBO | | 0425-41-1263 | | A | | |
| | | | | | | | |
| R99 → | SATO | | 03-261-4255 | | A | | D |

DATA STORAGE APPARATUS

BACKGROUND OF THE INVENTION

1. Field of the Invention

The present invention relates to a data storage apparatus comprising a data memory for storing a large number of data such as names and telephone numbers of persons, to read out desired data from the data memory and display the readout data on a display device.

2. Description of the Related Art

A conventional apparatus for storing a large number of data such as names and telephone numbers of persons in a memory, reading out desired data from the memory, and displaying the readout data on a display device is known, as described in U.S. Pat. Nos. 4,751,668 and 4,117,542. Along with the development of semiconductor techniques, the number of names and telephone numbers of persons to be stored in a memory is increasing to 50 and then 100.

When a phone call is made to a desired destination by using a conventional data storage apparatus of this type, a user causes the apparatus to search for a desired name and display the desired name. Available search methods are a method of alphabetically storing data in a memory and sequentially reading out data from the memory and displaying the readout data on the display every switch operation, as described in U.S. Pat. No. 4,751,668, and a method of inputting a full name or initials of a name of a person and directly displaying data corresponding to the input data, as described in U.S. Pat. No. 4,117,542. An auto-dialing apparatus is also known as described in U.S. Pat. No. 4,769,836, wherein a desired name of a person or subscriber and a telephone number are displayed, the displayed name and telephone number are checked, and an auto-dialing tones are generated to a handset upon switch operations.

In the apparatus for sequentially reading out names and telephone numbers whose data are stored in a memory, as described in U.S. Pat. No. 4,751,668, the names and telephone numbers of persons are sequentially displayed on a display unit upon switch operations. When a desired name and its corresponding telephone number are displayed, a user of the apparatus dials the telephone number. For example, 100 telephone number data are stored in the memory. If the user wants to make calls for 20 out of the 100 telephone numbers, the storage locations of the names of persons corresponding to these 20 telephone numbers are unknown. Therefore, since the names of 100 persons and the 100 telephone numbers must be sequentially displayed on the display unit upon switch operations, the switch operation becomes very troublesome.

When names of persons are directly input by key inputs, as described in U.S. Pat. No. 4,117,542, full names or initials of 20 persons must be input with keys, resulting in inconvenience. In addition, the apparatus of this type requires a keyboard for inputting names of persons and a complicated circuit means for reading out the same data as the input name data.

When the callee is out or the line is busy, a phone call is made for the next subscriber according to any one of the conventional methods described above. In this case, when the number of callees is large, the user is often confused of persons whose lines are busy and persons whose lines are not busy. Therefore, the user forgets to call again the person whose line has been busy or calls the same person twice.

SUMMARY OF THE INVENTION

The present invention has been made in consideration of the above situation, and has as its object to provide a data storage apparatus capable of efficiently displaying only desired telephone numbers of a large number of telephone number date stored in a memory.

According to the present invention, data storage apparatus includes a telephone number data storing memory having number memory areas for storing telephone number data in at least numerical form, and an identification data storing memory arranged in one-to-one correspondence with the number memory areas of the telephone number data storing memory, for storing identification data. First display control circuitry sequentially reads out and displays on a display unit the telephone number data stored in the number memory areas of the telephone number data storing memory, and second display control circuitry sequentially reads out and displays on the display unit telephone number data stored in number memory areas which correspond to the identification data storing memory.

With the above arrangement, the user can call a plurality of destinations with simple operations. Therefore, double calling can be prevented and the user does not forget to call a desired person.

DETAILED DESCRIPTION OF THE PREFERRED EMBODIMENTS

First Embodiment

A first embodiment of the present invention will be described with reference to the accompanying drawings. This embodiment exemplifies a timepiece apparatus such as a wristwatch which adapts the present invention.

Figure 1:
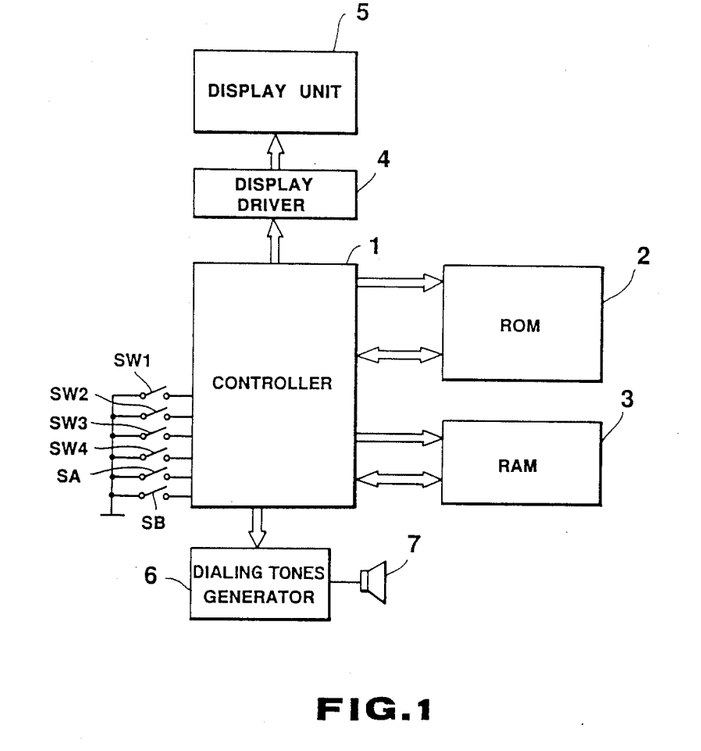
FIG. 1 is a diagram showing an embodiment of the present invention.

FIG. 1 is a diagram showing a circuit arrangement of the first embodiment. The arrangement in FIG. 1 will be described below.

Switch signals from a search selection switch SW1, a time/reservation selection switch SW2, a search/reservation selection switch SW3, an alarm switch SW4, a search switch SA, and a reservation switch SB are output to a controller 1. The controller 1 includes a microprocessor. A ROM (Read-Only Memory) 2 stores microprograms for controlling the entire system and various data. When the ROM 2 is addressed by the controller 1, program data of the addressed processing or other data are output from the ROM 2 to the controller 1.

The controller 1 performs various processing operations on the basis of the program data. The processing operations include: processing for storing subscriber data in a RAM (Random Access Memory) 3; processing for reading out the subscriber data from the RAM 3 and causing a display unit 5 such as a dot matrix type liquid crystal display to display the readout data through a display driver 4; and processing for sending a telephone number of subscriber data to a dialing tones generator 6 (to be described later), causing the dialing tones generator 6 to convert the telephone number data into a frequency signal corresponding to dialing tones, supplying the frequency signal from the dialing tones generator 6 to a speaker 7, and outputting the frequency signal as dialing tones from the speaker 7.

The controller 1 includes an oscillator (not shown) and a frequency divider for frequency-dividing an output from the oscillator to generate a time count signal and various timing signals. The controller 1 obtains time data or executes various programs by using the time count signal in accordance with the programs stored in the ROM 2.

The time/search selection switch SW1 selects a time mode for causing the display unit 5 to display time data or a search mode for searching for subscriber information (e.g., a subscriber name, a telephone number, and reservation data) stored in the RAM 3 and causing the display unit 5 to display the searched data.

The time/reservation selection switch SW2 selects the time mode or a reservation mode. The reservation mode is defined as a mode for displaying only reserved data.

The search/reservation selection switch SW3 switches the search mode to the reservation mode. The alarm switch SW4 is operated when alarm tones as dialing tones are generated by the auto-dial unit set to a handset.

The search switch SA is used to sequentially search for data stored in the RAM in the search and reservation modes. The reservation switch SB is used to reserve or cancel a telephone number in the search mode and to reserve a call when the line is busy in the reservation mode.

Figure 2:
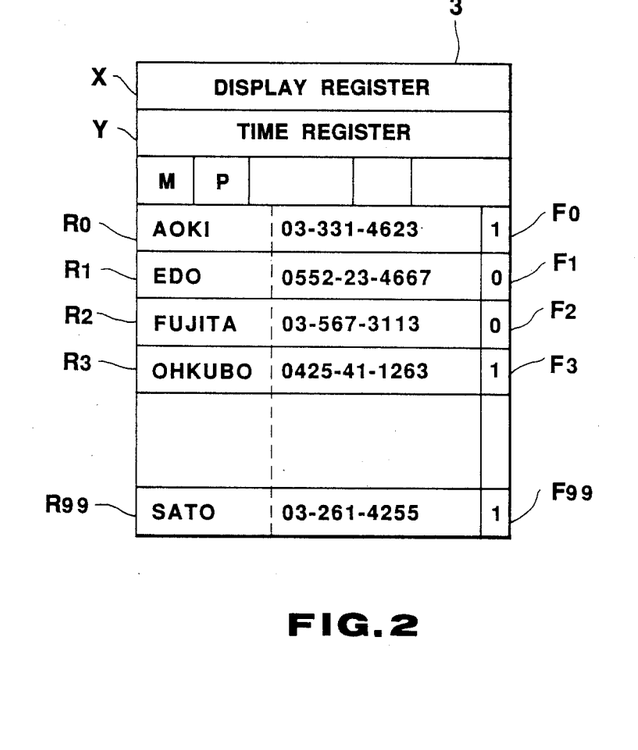
FIG. 2 shows a data format of a memory area of a RAM 3 shown in FIG. 1.

FIG. 2 shows the memory area of the RAM 3.

A display register X stores data displayed on the display unit 5. A time register Y counts the current date, the day of the week, and the current time.

Reference symbol M denotes a mode register. When the mode register M is set at "0", it represents the time mode; when "1", the search mode; and when "2", the reservation mode. Registers R0 to R99 store data of names and telephone numbers of persons. Reservation flag memory areas F0 to F99 for respectively storing 1-bit identification data are arranged in correspondence with the registers R0 to R99.

A register P is a pointer for storing an address for designating one of the memory areas F0 to F99.

An operation of the wristwatch having the above arrangement will be described with reference to flow charts of FIGS. 3A and 3B and a view showing a display state of FIG. 4.

Figure 3A:
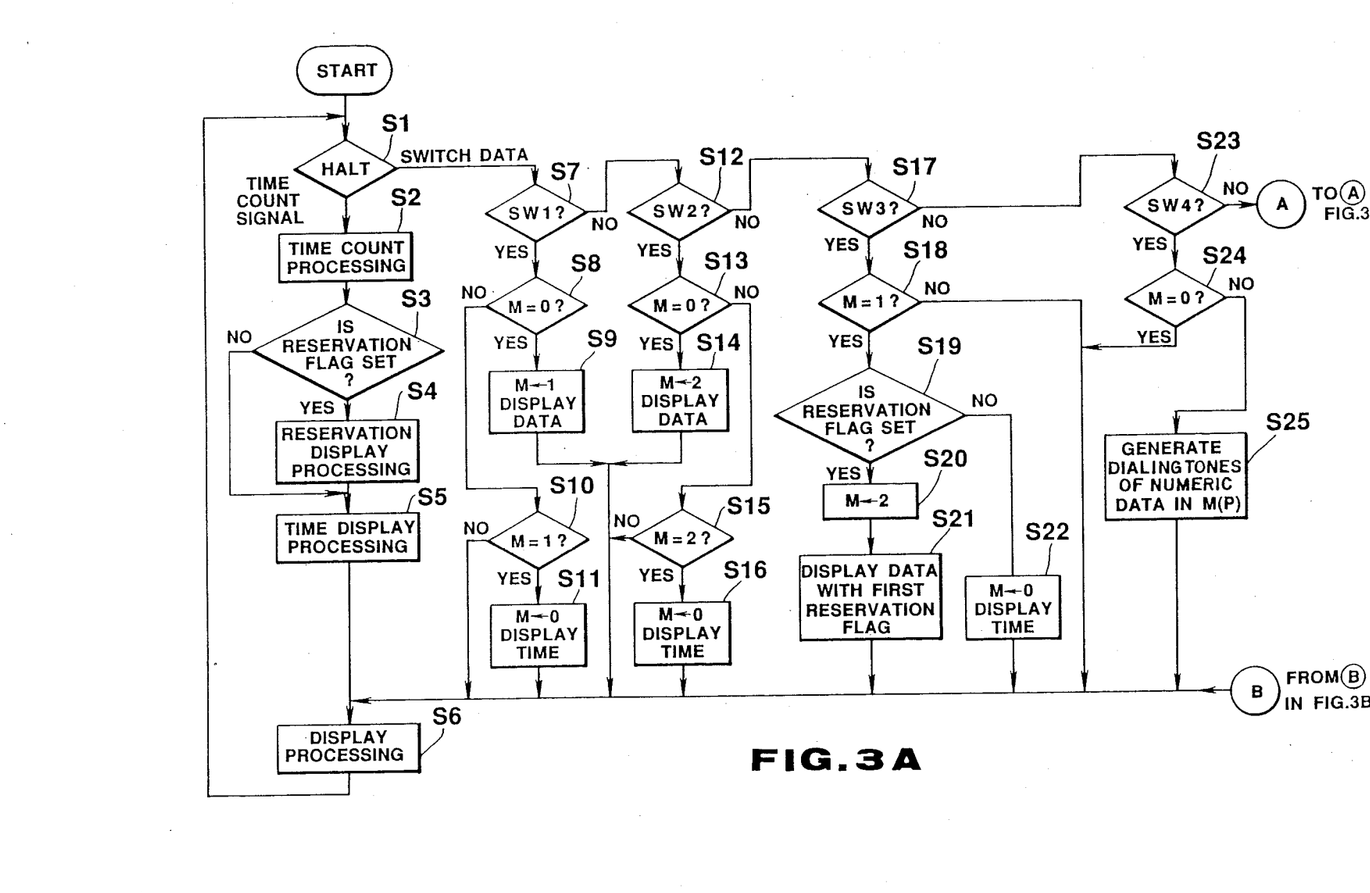
FIGS. 3A and 3B are flow charts for explaining the operations of the circuit shown in FIG. 1.
Figure 3B:
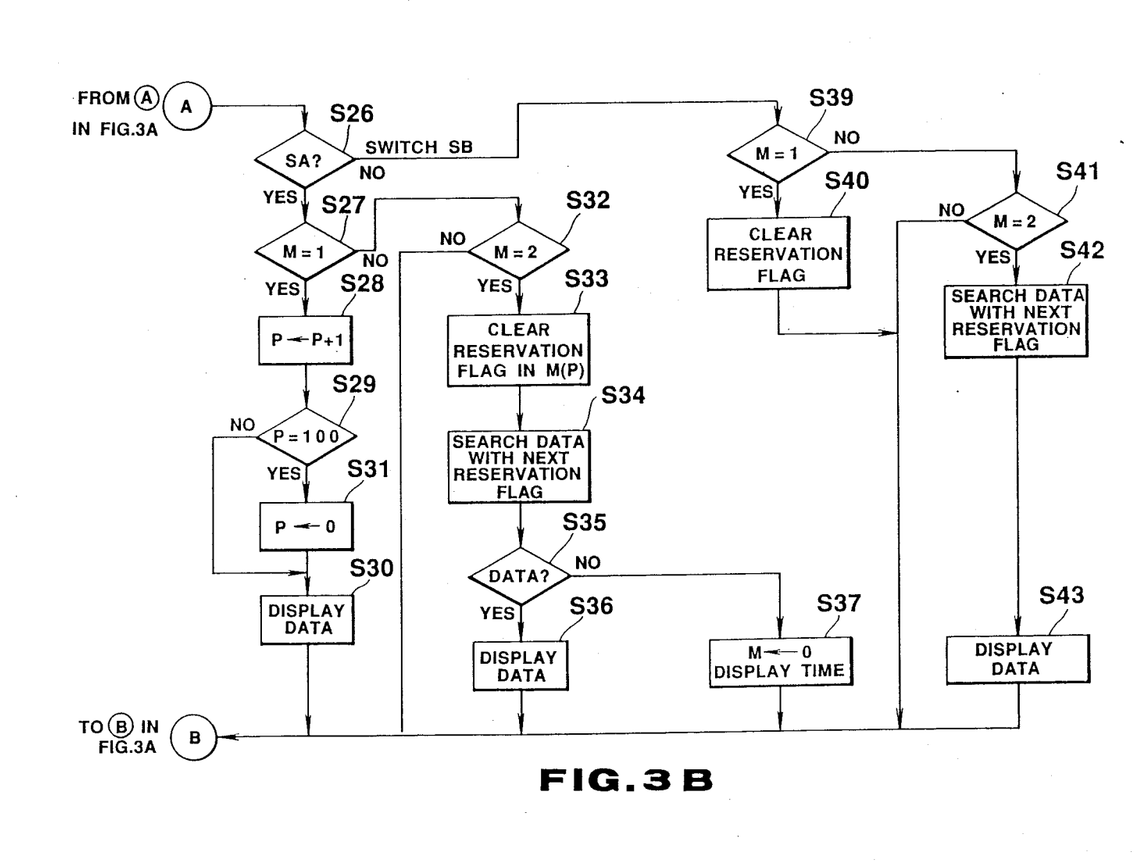

FIGS. 3A and 3B are flow charts for explaining the processing of the wristwatch system. When a time count signal is input from a frequency divider (not shown) in a HALT state (step S1), the controller 1 performs time counting in step S2 to update the current time data stored in the time register Y. The controller 1 determines in step S3 whether reservation data is present. If YES in step S3, reservation display processing is executed in step S4. That is, the controller 1 detects in step S3 whether data "1" is set in any one of the reservation flags F0 to F99 of the RAM 3. If the reservation flag is set (i.e., if there is a flag of "1"), display processing for displaying a reservation display mark Z shown in FIG. 4 is performed in step S4, and the flow advances to step S5 in which time display processing is performed. However, if there is no reservation flag (i.e., if NO in step S3), reservation display is not performed, and time display processing is performed in step S5. In the time display processing of step S5, time data is transferred from the time register Y to the display register X of the RAM 3. In step S6, when a time mode (to be described in detail later) is set, i.e., when the value of the register M is "0", the current time data transferred to the register X of the RAM 3 is output to the display unit 5 through the display driver 4. The display unit 5 displays this time data.

When a signal from a switch (any one of the switches SW1 to SB) is input to the controller 1 in the HALT state (step S1) upon operation of the switch, processing corresponding to the input signal is performed. Processing responsive to the switch operation will be described below.

The controller 1 detects in step S7 whether the operated switch is the switch SW1. If YES in step S7, the flow advances to step S8. The current mode is detected by checking the flag M in step S8. If the detected mode is the time mode, i.e., M="0", the flow advances to step S9. In step S9, "1" is set in the register M, and therefore the search mode is set. At the same time, name data and telephone number data which are stored in the register addressed by the pointer P are read out from the corresponding one of the registers R0 to R99. The readout data are transferred to the register X. The flow advances to step S6. The controller 1 confirms M="1", i.e., the search mode. The name and telephone number data stored in the display register X are displayed on the display unit 5. However, if the controller 1 detects in step S8 that the time mode is not set, the flow advances to step S10 to detects whether the current mode is the search mode (i.e., M="1"). If YES in step S10, processing for switching the current mode to the time mode is performed in step S11. In step S11, data "0" is set in the register M, and the time data is transferred from the time register Y to the display register X. In step S6, the current time data is displayed on the display unit 5. However, when the controller 1 detects in step S10 that the current mode is not the search mode, the current mode is the reservation mode (i.e., M="2"). In this case, the mode is not changed even if the time/search switch SW1 is operated.

When the switch SW2 is operated in the HALT state, the controller 1 detects in step S12 that the switch SW2 is operated. The controller 1 detects in step S13 whether the register M is set to be "0". If the time mode (M="0") is detected in step S13, the flow advances to step S14. In step S14, data "2" is set in the register M, and the mode is changed to the reservation mode. The controller 1 detects in step S14 whether data "1" is set in a reservation flag memory area n (n=0 to 99) of a register Rn addressed by the pointer P. If the reservation flag is "0", the pointer P is incremented by one. The controller 1 detects whether the reservation flag of the register R(n+1) is "1" or "0". This detection is repeated in each memory area. When a register whose memory area is detected to be "1" is detected, the name and telephone number data stored in the detected register are transferred together with the reservation flag to the display register X. Therefore, the controller 1 detects in step S6 that the reservation mode is selected, and then the contents (name, telephone number, and reservation flag of "1") of the display register X are displayed on the display unit 5.

However, when the current mode is detected not to be the time mode in step S13, the controller 1 detects in step S15 whether the current mode is the reservation mode, i.e., M="2". If YES in step S15, data "0" is set in the mode flag M, and then the mode is changed to the time mode. The time data stored in the time register Y is transferred to the register X. Display processing is executed in step S6. However, when the controller 1 detects in step S15 that the current mode is not the reservation mode, it detects that the current mode is the search mode. In the search mode, even if the switch SW2 is operated, the mode is not changed.

The operation of the switch SW3 is detected in step S17. The controller 1 detects in step S18 whether the current mode is the search mode, i.e., M="1". If the detection result of step S18 does not represent that the current mode is not the search mode, no processing is executed. However, if YES in step S18, the controller 1 detects in step S19 whether the reservation flag, i.e., data "1" is stored in the reservation flag memory area Fn of the register Rn addressed by the pointer P. If no reservation flag is set in the register Rn, the pointer P is incremented by one, and the reservation flag of the next register R(n+1) is checked. If the reserved register is searched, the flow advances to step S20. In step S20, data "2" is set in the mode flag M. The name, telephone number, and reservation flag data which are searched in step S21 are transferred to the display register X. These data are displayed on the display unit 5 in step S6. If no reservation is set in any one of the registers R0 to R99 (i.e., if NO in step S19), the flow advances to step S22, and the mode is switched to the time mode.

Upon operation of the alarm switch SW4, this operation is detected in step S23. The controller 1 detects in step S24 whether the current mode is the time mode (M="0"). If NO in step S24, the current mode must be the search or reservation mode. The telephone number data addressed by the pointer P and currently displayed on the display unit 5 are converted to dialing tones in step S25. That is, the telephone number data of the register Rn addressed by the pointer P is read out by the controller 1. The readout telephone number data is output to the dialing tones generator 6. The dialing tones generator 6 converts the input data into a dial frequency signal corresponding to the numeric data and supplies the dial frequency signal to the speaker 7. The speaker 7 outputs this signal as dialing tones.

The operation of the search switch SA is detected in step S26 in FIG. 3B. When the controller 1 detects in step S27 that the current mode is the search mode (M="1"), the flow advances to step S28. In step S28, the pointer P is incremented by one. If the updated value of the pointer P has not reached 100, i.e., if NO in step S28, the data (the subscriber name, his telephone number, and a reservation condition) of the register addressed by the pointer P are displayed in step S30. If the updated value of the pointer P has reached 100, the pointer P is initialized to be 0 in step S31, and the registers are addressed from the first register.

When the search switch SA is operated in a mode except for the search mode (M="1"), NO is obtained in step S27, and the flow advances to step S32. The controller 1 detects in step S32 whether the current mode is the reservation mode (M="2"). If NO in step S32, the current mode must be the time mode. The display content is not changed even if the search switch SA is operated. When the reservation mode (M="2") is set, processing is performed to cancel the reservation of the currently displayed telephone number. In step S33, data "0" is set in the reservation flag of the register corresponding to the dialing tones output. A search operation for the next reservation memory area is started in step S34. When a register having a reservation is detected as a result of the search operation, YES is obtained in step S35. The controller 1 transfers the content of this register to the display register X in step S36. The content of the display register X is displayed on the display unit 5 in step S6. If there is no memory area having a reservation flag of "1" (i.e., if NO in step S35), the current mode is switched to the time mode (steps S37 and S6).

If the operated switch is determined not to be the switch SA in step S26, the controller 1 detects that the reservation switch SB is operated. The flow advances to step S39. The controller 1 checks the current mode in step S39. When the current mode is detected to be the search mode (M="1"), the flow advances to step S40, and the reservation flag is inverted. Therefore, registration or deletion of the reservation flag for the telephone number can be performed. If the current mode is detected to be the reservation mode (M="2"), YES is obtained in step S41, and the reservation for the currently displayed content of the register is not canceled. In this case, a register having the next reservation flag is searched. The content of the newly searched register is transferred to the display register X in step S43, thereby displaying the content of the register X. FIG. 4 is a view for explaining operations of the flow charts by using display contents of the display unit 5.

Figure 4:
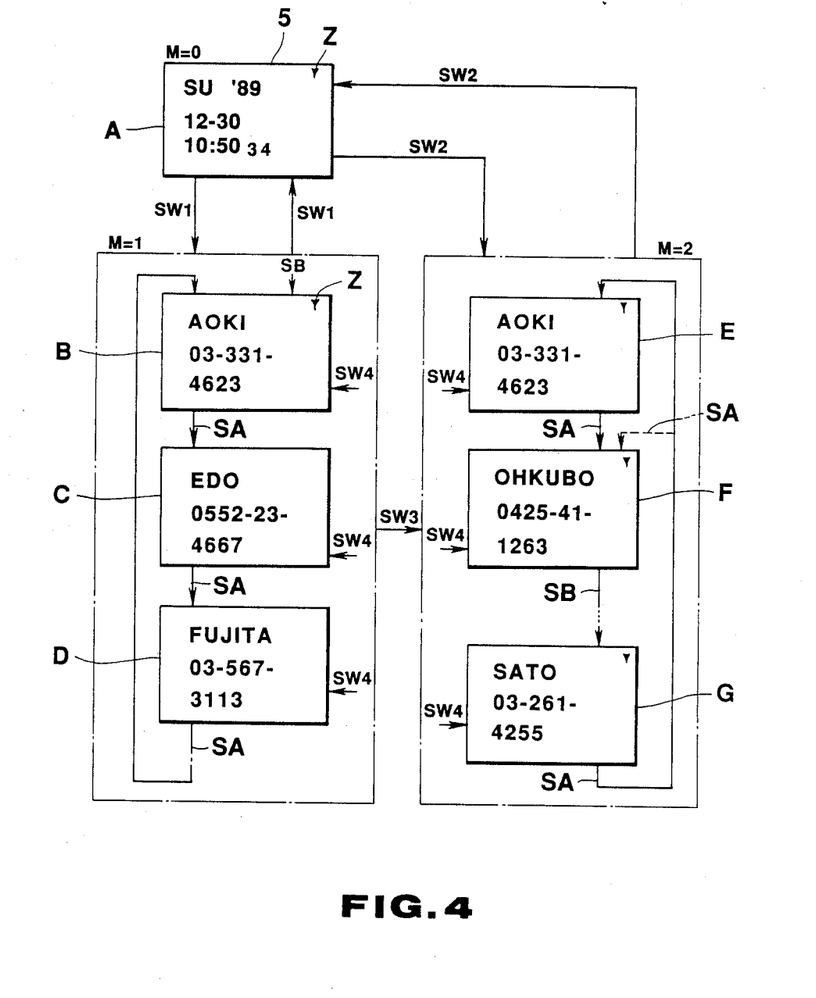
FIG. 4 is a view showing a display state for explaining the operation of the above embodiment.

When the time mode (M="0") is set, the current time data is displayed, as shown in a display A of FIG. 4. In the display A, the day-of-the-week and year data (SU '89) are displayed on the upper line, date data (12-30) is displayed on the middle line, and hour, minute, and second data (10:50 34) is displayed on the lower line. When a reservation for a phone call is made, operations in steps S3 and S4 are executed to display a reservation display mark indicated by the inverted triangle at the upper right portion of the display unit 5.

Whenever the switch SW1 is operated, the time mode (M="0") and the search mode (M="1") are alternately switched in the operations of steps S7 to S11.

In the search mode (M="1"), the reservation display mark Z indicates that the currently displayed data is the reserved data. The reservation is performed by the operations of steps S39 and S40 upon operation of the switch SB in the search mode (M=1). When the reservation switch SB is operated while the reservation data is displayed in the search mode, the reservation is canceled. When the alarm switch SW4 is operated in the search mode (M="1"), dialing tones corresponding to the telephone number are generated by the operations of steps S23 to S25. When the search switch SA is operated in the search mode (M="1"), the name data, the telephone number data, and the reservation condition are sequentially read out from the registers R0 to R99 and displayed by the operations of steps S27 to S30, as shown in displays B to D of FIG. 4.

In order to directly switch the search mode (M="1") to the reservation mode (M="2"), the switch SW3 is operated. Upon this operation, processing in steps S17 to S21 is performed to set the mode to the reservation mode. When the time/reservation selection switch SW2 is operated in the time mode, processing in steps S13 to S16 is performed to alternately switch between the time mode (M="0") and the reservation mode (M="2"), thereby setting the mode to the reservation mode.

When the reservation mode (M="2") is selected, only the content of the register Rn which stores the reservation flag is displayed, as shown in displays E to G of FIG. 4. When the alarm switch SW4 is operated in the reservation mode (M="2") in the same manner as in the search mode (M="1"), the dialing tones corresponding to the telephone number displayed on the display unit 5 are generated in step S25. Therefore, the user can talk to the callee.

When the user finishes talking to the current callee and wants to make a call to the next callee, the user operates the search switch SA. When the search switch SA is operated in the reservation mode (M="2"), the displayed reservation of the register Rn is canceled in processing of steps S32 to S36, and the next reserved subscriber information is displayed. Therefore, the user will not accidentally call the same callee twice.

When the user makes a call but the callee does not answer the phone, e.g., the line is busy or the callee is out, the reservation switch SB is operated in the reservation mode (M="2"). In this case, the reservation is not canceled and the next subscriber information is displayed in step S42. Therefore, the user does not forget to call a callee who did not answer the phone.

According to the above embodiment, as described above, if a reservation flag is set for any registered telephone number in advance, only the reserved telephone number can be displayed with a simple operation, i.e., an operation of only the search switch. When the alarm switch is operated, the user can accurately and simply call any desired registered subscriber. If the user wants to call a plurality of subscribers, the user need operate the search switch only once for calling the second and subsequent subscribers. In addition, callees who talked to the user can be canceled. Therefore, the user will not be misled to call the same callee twice. When the user cannot talk to a callee, the reservation is kept maintained. Therefore, the user will not forget to call the callee who did not talk to the user.

Figure 5:
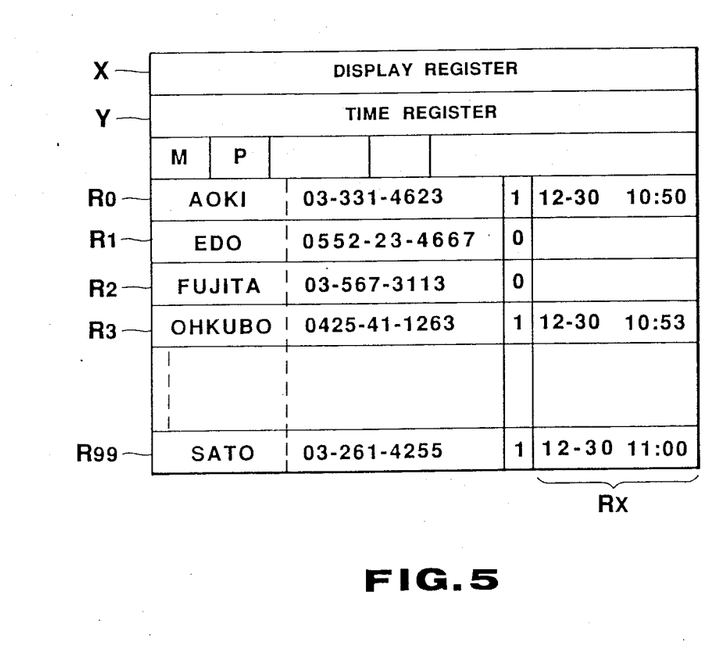
FIG. 5 shows a data format of a RAM used in another embodiment of the present invention.
Figure 6:
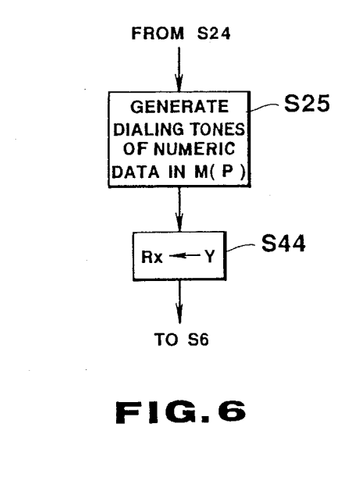
FIG. 6 is a partial flow chart when the RAM in FIG. 5 is used.

In the above embodiment, whether or not the user talked to the callee is detected by the presence/absence of the reservation flag. However, as shown in FIG. 5, time memory areas Rx may be arranged in the registers R0 to R99, respectively. After dialing tones are generated in step S25 of FIG. 3A, an operation in step S44 of FIG. 6 is performed to transfer the current time of the register Y upon generation of the dialing tones in step S44 to the memory area Rx. Therefore, the date and time of each call can be stored.

Therefore, the user operates a switch (not shown) or the like to selectively display the date and time data of the memory area Rx on the display unit 5, thereby checking the time when he made each call.

Second Embodiment

Figure 7:
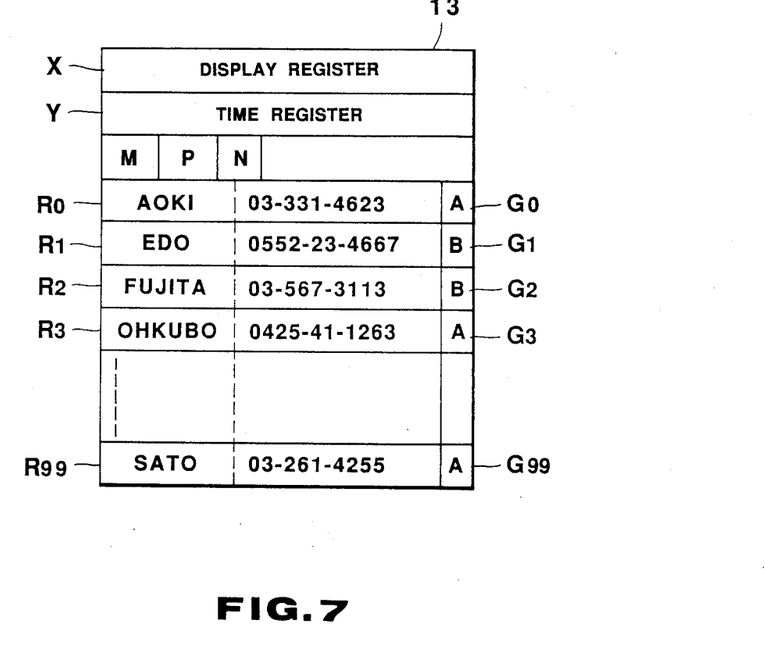
FIG. 7 shows a data format of a RAM used in still another embodiment of the present invention.

FIGS. 7 to 10 show a second embodiment of the present invention. A circuit arrangement of the second embodiment is the same as that of FIG. 1, and a RAM 13 shown in FIG. 7 is used in place of the RAM 3 in FIG. 1. Programs of flow charts in FIGS. 8A and 8B are stored in a ROM 2 in place of programs of the flow charts in FIGS. 3A and 3B. The same reference numerals as in the arrangement, the flow charts, and the display states in FIGS. 1 to 6 denote the same parts in FIGS. 7 to 10, and a detailed description thereof will be omitted.

A register N is arranged in the RAM 13 of FIG. 7 as compared with the RAM 3 of FIG. 2. Identification memory areas G0 to G99 are arranged in place of the reservation flag memory areas F0 to F99 of the RAM 3. The identification data memory areas G0 to G99 comprise a plurality of bits and can store one of letter data of letters A to Z. The content of the register N and the data stored in the memory areas G0 to G99 can be displayed on a display unit 5 (to be described in detail later). In this case, the letter data stored in the memory areas G0 to G99 can be displayed as a letter. The letter data are displayed in accordance with the contents of the register N. For example, if the content of the register N is "0", letter A is displayed; if "1", letter B; if "2", letter C; and the like.

Figure 8A:
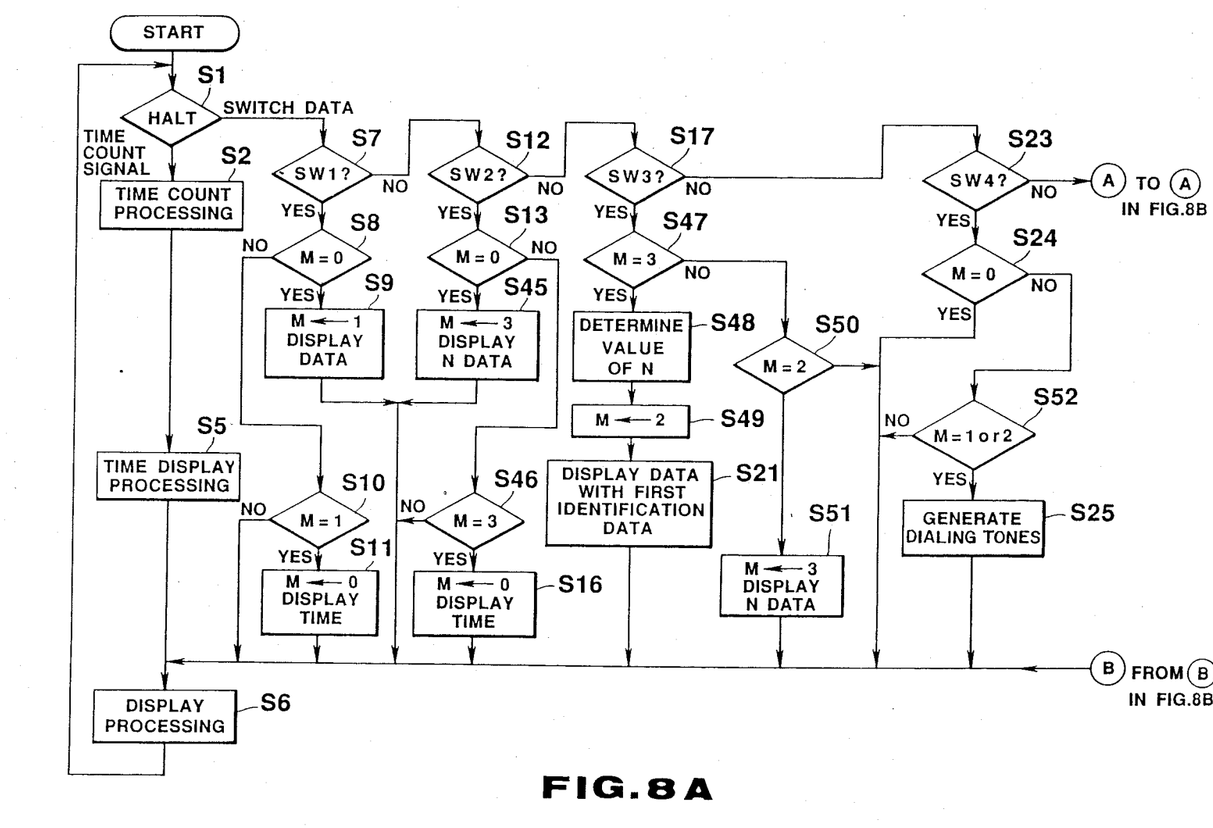
FIGS. 8A and 8B are flow charts for explaining an operation when the RAM in FIG. 7 is used.
Figure 8B:
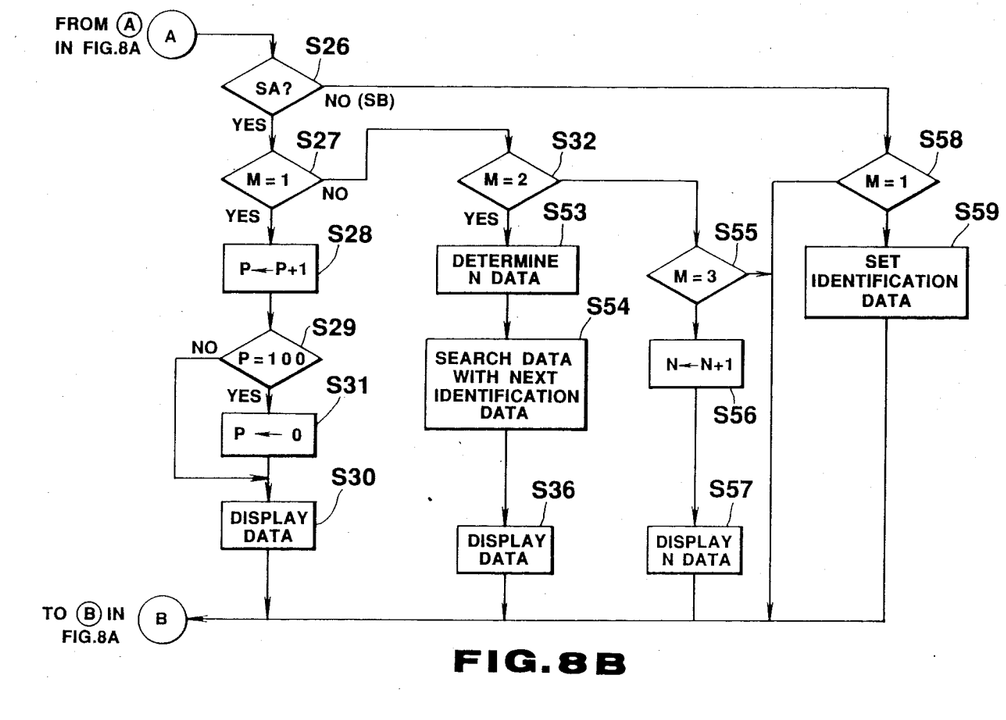

FIGS. 8A and 8B are flow charts of the second embodiment. Referring to FIG. 8A, steps S3 and S4 are omitted from the flow chart of FIG. 3A. That is, the search operation for the reservation flag is not performed. In the time mode (M="0"), only the current time is displayed on the display unit 5, as indicated by a display A of FIG. 9. The operation of a switch SW1 is detected in step S7, and the operations in steps S8 to S11 are the same as those in FIG. 3A. The switch SW1 selectively sets the time mode of the display A of FIG. 9 or the search mode (M="1") indicated by displays B, C, and D of FIG. 9. In the search mode, identification data A, B, . . . respectively stored in the memory areas G0 to G99 are displayed at the upper right portion of the display unit 5, as indicated by the displays B, C, and D of FIG. 9.

Figure 9:
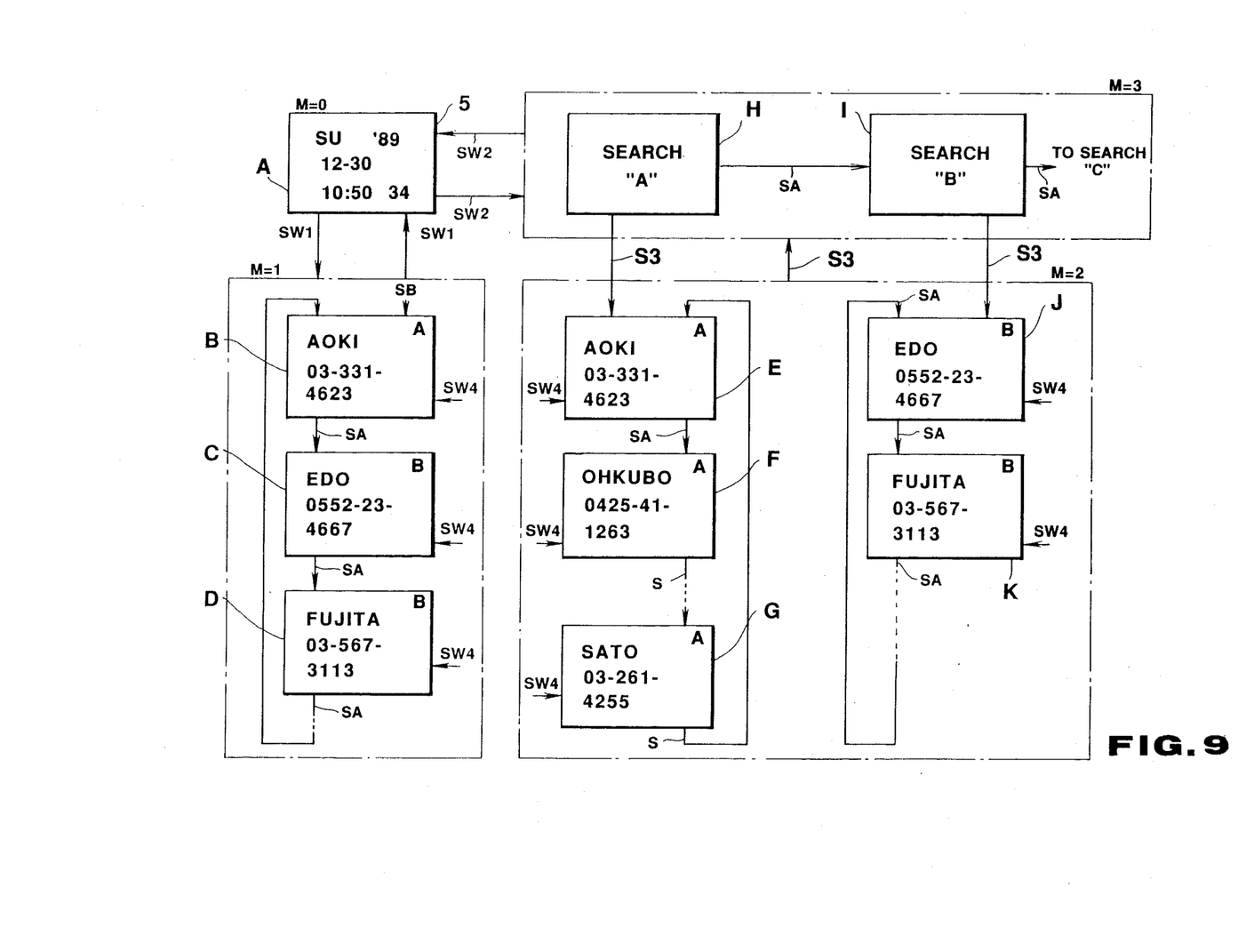
FIG. 9 is a view showing a change in display state of the embodiment shown in FIG. 7.

As shown in FIG. 9, an identification data search mode set for M="3" is additionally provided in this embodiment. The search mode and the time mode are switched upon operation of a switch SW2. The operation of the switch SW2 is detected in step S12 of FIG. 8A. When M="0" is detected in step S13, data "3" is set in the register M in the next step S45. A letter such as "A", "B", or the like corresponding to the value of the register N and letters "search" are displayed. In the identification data search mode (M="3"), a display such as display H or I of FIG. 9 can be obtained. When the switch SW2 is operated while M="3", it is detected in step S46, and the mode is changed to the time mode in the next step S16.

As shown in FIG. 9, the identification data search mode (M="3") and the reservation mode (M="2") are switched by a switch SW3. That is, the controller detects in step S17 of FIG. 8A whether the switch SW3 is operated. The flow advances to step S47 to detect whether the value of the mode register M is "3". If YES in step S47, the value of the register N is checked in step S48. As indicated by the display H of FIG. 9, when the switch SW3 is operated while letter A is being displayed, i.e., while the value of the register N is "0", only the content of the register R corresponding to the identification data A stored in the memory areas G0 to G99 of the RAM 13 is displayed upon operation of a switch SA (displays E, F, and G in FIG. 9). When the switch SW3 is operated in the display state I of FIG. 9 while the value of the register N is "1" and letter B is kept displayed, only the content of the register corresponding to the data B stored in the memory areas G is displayed, as indicated by displays J and K of FIG. 9 or by the RAM 13.

The controller checks the value of the register N in step S48 of FIG. 8A. Data "2" is set in the register M in the next step S49 to set the reservation mode. In step S21, one of the registers R0 to R99 which stores identification data corresponding to the value of the register N, i.e., identification data A stored in the memory areas G is addressed by a pointer P. The content of this register can be displayed. When the value of the register M is detected not to be "3" in step S47, the controller detects in step S50 whether the value of the register M is "2", i.e., the current mode is the reservation mode. If YES in step S50, the identification data search mode (M="3") is restored in step S51. That is, when the switch SW3 is operated in the reservation mode (M="2") of FIG. 9, the identification data search mode (M="3") is restored.

Dialing tones are generated in the search mode (M="1") and the reservation mode (M="2") upon operation of a switch SW4 in the same manner as in FIG. 3A. In this embodiment, since the M="3" mode is added, the operation in step S52 is provided to prevent the dialing tones output. The dialing tones are output in step S25 only when M="1" or "2".

In the search mode (M="1"), the data of all the registers R0 to R99 can be sequentially displayed upon every operation of the switch SA in the same manner as in the first embodiment, which is performed in steps S26 to S30 of FIG. 8B.

As described above, the switch SA serves as a switch for sequentially displaying the content of the register R which stores the identification data corresponding to the value of the register N in the reservation mode (M="2"). In addition, the switch SA serves as a switch which increments the value of the register N one by one to sequentially switch the letter to be displayed when M="3", i.e., a switch for sequentially selecting the identification data. When the switch SA is operated in the reservation mode (M="2") in FIG. 8B, the switch operation is detected in step S32. The value held in the register N is detected in step S53, and the register R which stores the identification data corresponding to the value of the register N is searched, and the content of the register is displayed in step S36. As shown in the displays E, F, and G, or the displays J and K of FIG. 9, only the registers which store the same identification data are sequentially accessed, and the readout data are sequentially displayed. The operation of the switch SA when M=3 is detected in step S55 of FIG. 8B, and the value of the register N is incremented in step S56 and displayed in step S57. The identification data are sequentially selected upon every operation of the switch SA, as indicated by the displays H and I of FIG. 9.

The operation of the switch SB is valid only when M="1". That is, M="1" is detected in step S58. In step S59, the identification data of the memory areas G of the registers addressed by the pointer P and subjected to the display are sequentially updated and set when M="1". The identification data are sequentially updated from A to Z upon every operation of the switch SB.

As described above, in the second embodiment, one of the plurality of identification data is made to correspond to each name and a corresponding telephone number. A group display can be performed such that the identification data A represents employees of a specific company, B represents employees of another company, and C represents personal friends. When a user makes calls to a specific group, the above arrangement is very convenient.

Figure 10:
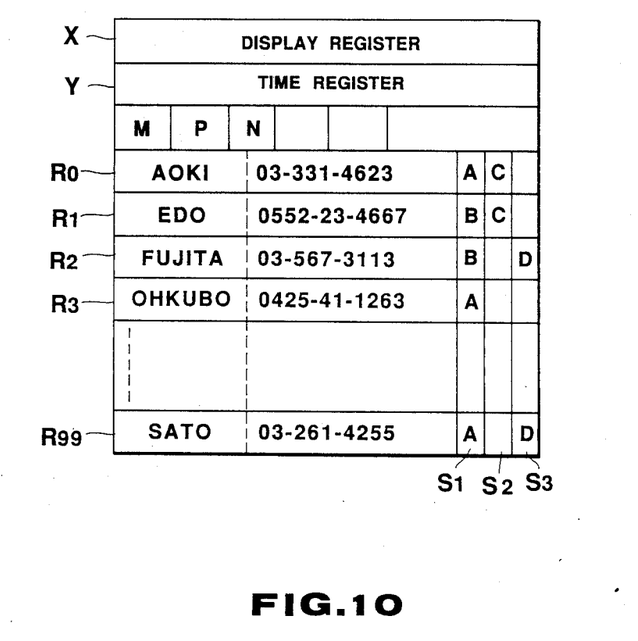
FIG. 10 shows a data format of a RAM used in still another embodiment of the present invention.

Data each assigned to a corresponding telephone number are stored in the identification data storage. However, as shown in FIG. 10, memory areas S1, S2, and S3 may be arranged to make one telephone number to correspond to a plurality of identification data.

As shown in FIG. 5, the memory area Rx may be arranged to store time obtained when a call is made, i.e., auto-dialing tones are output.

Each of the first and second embodiments described above exemplifies the apparatus having a timepiece function. However, the present invention is not limited to an apparatus having a timepiece function, but is also applicable to an electronic pocketbook, an IC card, a compact calculator, or a telephone apparatus itself.

Addresses or the like may be stored in the RAM 3 or 13 and displayed in place of names and telephone numbers.

I claim:

1. A data storage apparatus comprising:
   telephone number data storing means having a plurality of number memory areas for storing telephone number data including at least numerical data;
   identification data storing means, arranged in a one-to-one correspondence with said plurality of number memory areas of said telephone number data storing means, for storing identification data;
   display means:
   first display control means for sequentially reading out and displaying on said display means the telephone number data stored in said plurality of number memory areas of said telephone number data storing means; and
   second display control means for sequentially reading out and displaying on said display means telephone number data stored in number memory areas which correspond to said identification data storing means which store the identification data.

2. An apparatus according to claim 1, wherein the telephone number data represents at least a name and a telephone number of a person.

3. An apparatus according to claim 1, further comprising converting means for converting the telephone number data into dialing tones.

4. An apparatus according to claim 1, further comprising identification data display means for displaying the identification data.

5. An apparatus according to claim 1, further comprising tone generating means for converting the telephone number data into dialing tones, and means for clearing the identification data after the dialing tones are output from said tone generating means.

6. An apparatus according to claim 5, further comprising switch means for re-storing the identification data cleared by said clearing means.

7. An apparatus according to claim 1, comprising means for designating one of the plurality of number memory areas, and wherein said first display control means comprises an external operation switch, and the number memory area designated by said designating means is changed upon operation of said external operation switch.

8. An apparatus according to claim 1, wherein each of said identification data storing means stores one of the plurality of identification data.

9. An apparatus according to claim 1, wherein each of said identification data storing means stores one of the plurality of identification data, and said second display control means sequentially reads out the telephone number data from said number data storing means in correspondence with the identification data and displays the readout telephone number data.

10. An apparatus according to claim 1, wherein said identification data storing means comprise a plurality of identification data storing means for one number memory area.

11. An apparatus according to claim 10, wherein said identification data storing means can respectively store different identification data.

12. An apparatus according to claim 1, wherein said telephone number data storing means comprises a RAM (Random Access Memory).

13. An apparatus according to claim 1, wherein said first and second display control means execute processing in accordance with programs stored in a ROM (Read-Only Memory).

14. A data storage apparatus comprising:
time counting means for counting a time count signal to obtain current time data;
display means for displaying the current time data obtained by said time counting means;
telephone number data storing means having a plurality of number memory areas for storing telephone number data including at least numerical data;
identification data storing means, arranged in a one-to-one correspondence with the plurality of number memory areas of said telephone number data storing means, for storing identification data;
first display control means for sequentially reading out the telephone number data stored in the plurality of number memory areas of said telephone number data storing means and displaying the readout telephone number data on said display means; and
second display control means for sequentially reading out telephone number data stored in number memory areas which correspond to said identification data storing means which store the identification data and displaying the readout telephone number data on said display means.

15. An apparatus according to claim 14, wherein the telephone number data represents at least a name and a telephone number of a person.

16. An apparatus according to claim 14, further comprising means for converting the telephone number data into dialing tones.

17. An apparatus according to claim 14, further comprising identification data display means for displaying the identification data.

18. An apparatus according to claim 14, further comprising tone generating means for converting the telephone number data into dialing tones, and means for clearing the identification data when the dialing tones are output from said tone generating means.

19. An apparatus according to claim 18, further comprising switch means for re-storing the identification data cleared by said clearing means.

20. An apparatus according to claim 14, comprising means for designating one of the plurality of number memory areas, and wherein said first display control means comprises an external operation switch, and the number memory area designated by said designating means is changed upon operation of said external operation switch.

21. An apparatus according to claim 14, wherein each of said identification data storing means stores one of the plurality of identification data.

22. An apparatus according to claim 14, wherein each of said identification data storing means stores one of the plurality of identification data, and said second display control means sequentially reads out the telephone number data from said number data storing means in correspondence with the identification data and displays the readout telephone number data.

23. An apparatus according to claim 14, wherein said identification data storing means comprise a plurality of identification data storing means for one number memory area.

24. An apparatus according to claim 23, wherein said identification data storing means can respectively store different identification data.

25. An apparatus according to claim 14, wherein said telephone number data storing means comprises a RAM (Random Access Memory).

26. An apparatus according to claim 14, wherein said first and second display control means execute processing in accordance with programs stored in a ROM (Read-Only Memory).

27. An apparatus according to claim 14, further comprising dialing tones output means for converting the telephone number data into dialing tones and outputting the dialing tones, and time storing means for storing current time output from said time counting means, the current time representing time obtained when the dialing tones are output from said dialing tones output means.

28. An apparatus according to claim 1, wherein said identification data storing means comprise a one-bit flag register for storing data of "1" or "0".

29. An apparatus according to claim 27, wherein said time storing means comprises a memory area for storing date data and time data.

30. An apparatus according to claim 14, wherein said identification data storing means comprises a one-bit flag register for storing data of "1" or "0".

* * * * *